Oct. 30, 1934. H. GURSKY ET AL Re. 19,355
FOLDING COT
Original Filed May 4, 1929 2 Sheets-Sheet 1
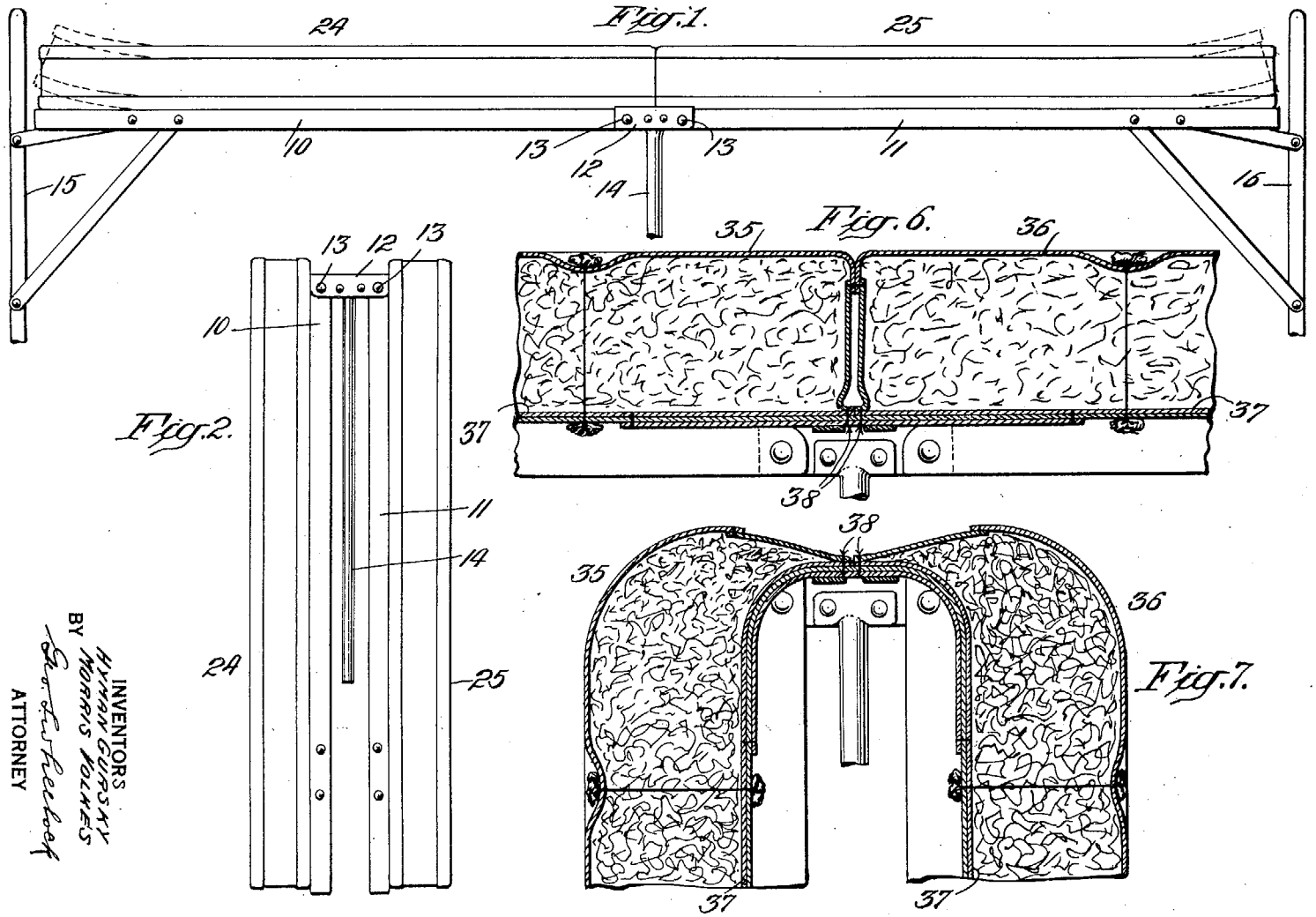
INVENTORS
HYMAN GURSKY
MORRIS VOLKES
BY Geo. L. Wheelock
ATTORNEY FOLDING COT
Original Filed May 4, 1929 2 Sheets-Sheet 2
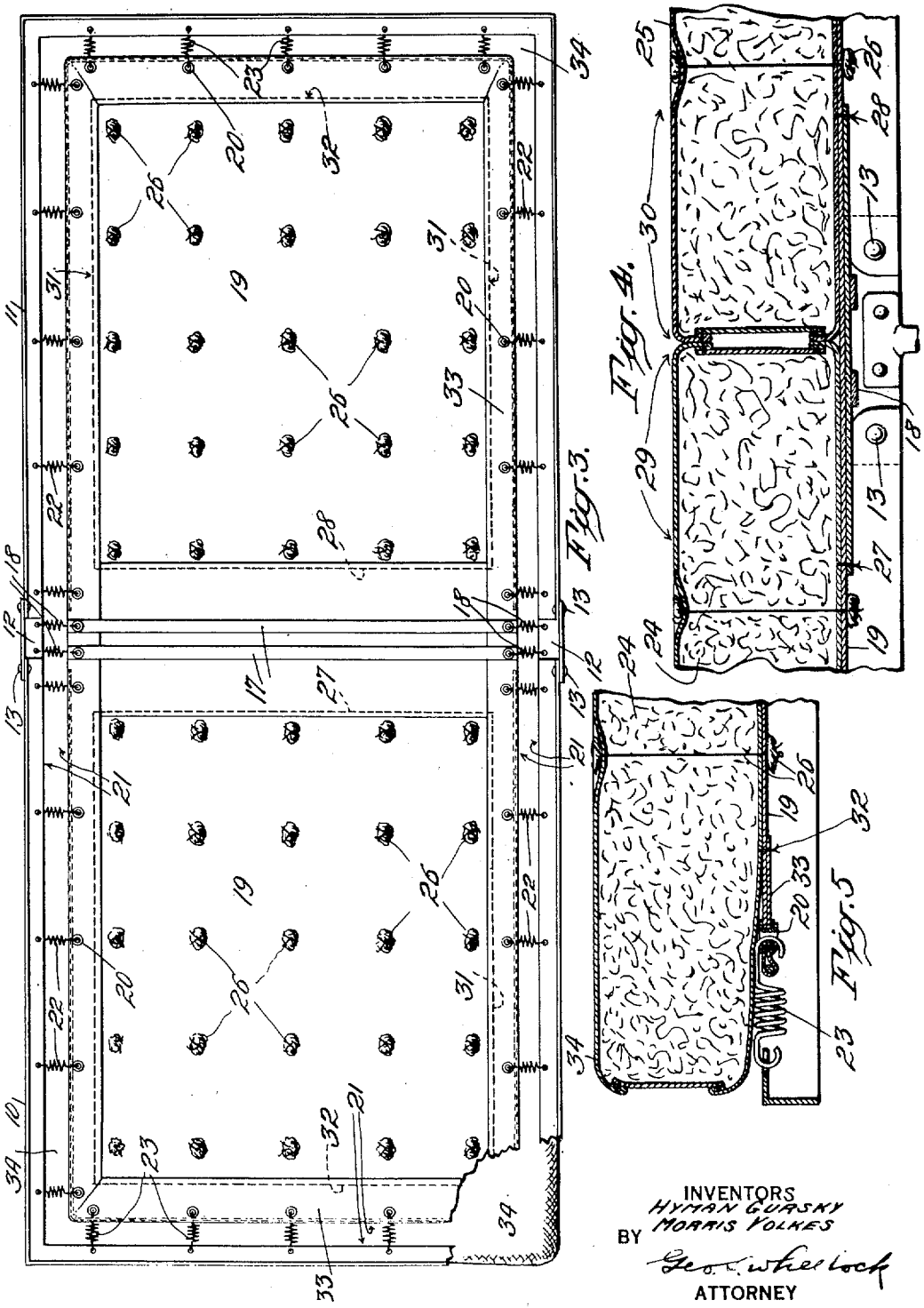
INVENTORS
HYMAN GURSKY
MORRIS VOLKES
BY Geo. E. Wheelock
ATTORNEY Reissued Oct. 30, 1934

Re. 19,355

UNITED STATES PATENT OFFICE 19,355

FOLDING COT

Hyman Gursky and Morris Volkes, Brooklyn, N. Y.

Original No. 1,785,258, dated December 16, 1930, Serial No. 360,390, May 4, 1929. Application for reissue November 13, 1931, Serial No. 574,888

5 Claims. (Cl. 5—357)

This invention relates to cots of the type composed of movable sections, preferably folding sections, and wherein a top of canvas or other suitable material is stretched within the main frame of the cot, so that it will be taut and in condition to flatly support the mattress thereon.

One of the objects of the present invention is to provide a combined flexible top and mattress of novel construction and wherein the mattress is of larger area than the top, and is stitched to the top in such way that the mattress and the top will be provided with free edge portions, the edge portions of the mattress extending beyond the edge portions of the top inasmuch as it is of greater area.

Another object of the invention is to provide a combined canvas top and a mattress which is in two sections, the top and the mattress being connected together by transverse lines of stitching which are located at a considerable distance back of the adjoining edges of the mattress sections, so that when the top and mattress are flattened out, the adjoining edges of the sections may abut, the corresponding edge portions of the adjacent ends of the mattress sections being free from the top in a direction inward from such transverse line of stitches.

Other objects of the invention are to provide a folding cot so constructed that a combined flexible top and mattress such as referred to may be applied thereto and held in place through the medium of tensioning means applied to the free edge portions of the top, the edge portions of the mattress at the sides and outer ends therefor extending considerably beyond the free edge portions of the top, so that the free edge portions of the mattress will extend over such tensioning means and over onto the frame to which the top is attached, thereby avoiding the exposing of the tensioning means from above and also avoiding the objection of a person who lies on the cot striking or coming in contact with the frame, inasmuch as the mattress also extends over that, as before mentioned.

Further objects are to provide improvements in cots which are not only desirable and efficient in service, but are comparatively inexpensive.

These being among the objects of the present invention, the same consists of certain features of construction and combinations of parts to be hereinafter described and then claimed with reference to the accompanying drawings showing preferred and modified embodiments of the invention, and in which:—

Figure 1 is a side elevation of a foldable cot, with the improved combined top and mattress applied thereto, and showing the cot in using position;

Fig. 2 is a side elevation showing the cot folded;

Fig. 3 is an underside plan view of the cot when opened out, the legs being omitted;

Fig. 4 is an enlarged transverse sectional detail longitudinally of the cot and showing the adjacent transverse edges of the two mattress sections in abutting relation;

Fig. 5 is a transverse section through one end of the cot, showing how the mattress overlies the tensioning means and the frame;

Fig. 6 is a sectional detail of a modification wherein the two mattress sections are shown as having a common piece of ticking at the bottom, which is secured transversely of its midlength to the flexible top, the parts being shown in using position; and Fig. 7 is a similar view showing the general appearance of the adjacent ends of the modified mattress sections when the cot is folded.

Referring to Figs. 1 to 5 inclusive of the drawings, the frame of the cot may comprise end sections 10, 11, which taken together are substantially the length of the cot, these being separated by short middle sections 12 one at each side of the end frame-sections. The end frame-sections are preferably composed of angle metal as is customary in cots of this description, and they are preferably connected with the middle sections 12 by means of pivots 13, so that the cot may be opened up as shown in Fig. 1 or closed up, as shown in Fig. 2. The middle sections are provided with one or more legs 14 and the end frame-sections are provided with end legs 15, 16 which are to be folded up with the cot when it is to be folded, and as such foldable legs are well known they will not be further described. A pair of middle stays 17 extend from one middle section 12 to the other, the ends thereof being attached by means of helical springs 18 to said middle sections, so as to hold said stays under tension.

The top 19 which is of flexible material such as canvas, is shown clearly in the underside view, Fig. 3, and is provided near its side and end edges with eyelets 20. The top 19 is somewhat smaller than the frame 10, 11, 12, which encloses it, so that it is separated therefrom by means of an all around space 21, as is customary, and the top is stretched and held to the frame by means of helical side springs 22 and helical end springs 23, which are attached to the frame and which engage the appropriate eyelets at the edges of the top. It will be seen that not only is the top stretched longitudinally, but also transversely, so that the top is held taut and under tension in various directions.

Preferably the mattress comprises two sections 24 and 25 composed of suitable outer coverings, as tickings, and stuffed in any preferred manner. Preferably the length of the combined mattress sections 24, 25 is substantially that of the length of the frame 10, 11, 12, or in other words the area of the mattress is preferably somewhat larger than the opening between the side and end bars of the frame so that it will extend over them when in use. Usually the mattress sections 24, 25 are secured at many points to the canvas top by ties 26 for tufting.

On reference more particularly to Figs. 4 and 5, the preferred manner of stitching the mattress to the top 19 is seen. (See also Figure 3). Transverse lines of stitching 27, 28 connect the middle portion of the top 19 with the two mattress sections 24, 25, and when the combined mattress and top are associated with the cot, the lines of stitches will lie on either side of the short middle sections 12 of the frame of the cot. These transverse lines of stitches 27, 28 are so located that there are left free edge portions 29, 30 at the adjacent transverse ends of the two mattress sections 24, 25, said lines of stitches only entering the bottom sheets of ticking of the two mattress sections. This construction enables the cot with the mattress sections to break along the middle portion of the cot when the same is folded as shown in Fig. 6. The adjacent ends of the mattress sections will abut together when the cot is unfolded or in open position, as shown in Fig. 1, thereby providing a continuous mattress from end to end of the cot.

There is other stitching between the canvas top and the bottom sheets of the mattress sections, including, longitudinal lines of stitches 31 extending parallel with the side edges of the top 19 and the mattress sections and also lines of stitches 32 which extend transversely and which are parallel with the end edges of the top and the mattress sections. Fig. 5 shows one of the lines of stitches 32, each line of stitches 32 and 33 making similar provision at the end and edge portions of the two mattress sections. The lines of stitches 31 are set back from the free side edges of the top 19 for a suitable distance, and similarly the lines of stitches 32 are set back from the end edges of the top. Owing to this location of the stitches 31 and 32, the top is provided with free edge portions at both the side edges and the end edges, and owing to the fact that the mattress is of somewhat greater area than that of the top 19, the mattress sections are provided with free edge portions 34 which extend beyond the side and end edges of the top so that they will overlap and cover the tensioning means 22 and 23 when the combined top and mattress is applied to the frame of the cot. Said free edge portions 34 of the mattress sections also extend sufficiently so as to lie over the frame 10, 11, 12. Thereby cots of the description involved are made not only more sightly than usual but, as the side and outer end edges of the mattress sections rest upon the frame 10, 11, 12, a person lying on the cot is protected against coming in contact, suddenly or otherwise, with the said frame. It is customary to make up the top 19 with the tickings for the mattress, that is to combine them as described, before the filling or stuffing is inserted in the ticking of the mattress, and then to stuff the mattress after the combined top and mattress has been applied to the frame of the cot, but of course, the stuffing may be inserted previously to applying the combined top and mattress to the frame. It will be seen that the lines of stitches 28 or 27 and 31, 32 extend continuously around, but at a distance from, the side and end edges of a mattress section, the tufting 26 being all disposed in the field enclosed by such lines of stitches.

Figs. 6 and 7 illustrate a slight modification wherein there are two mattress sections 35, 36, which are not entirely separated from each other at their adjoining inner edges, the said mattress sections having in common a bottom sheet 37 of ticking which extends continuously from end to end of the mattress sections. Transverse lines of stitches 38 connect the intermediate portion of the top of the cot with the bottom piece 37 of the two mattress sections 35, 36. The result is that no free edge portions are provided at the inner adjacent edges of the two mattress sections 35, 36, but above the common bottom piece of ticking they are free from each other. When a cot provided with this modified construction is in using position as shown in Fig. 6, the adjacent end edges of the sections 35, 36, will come into abutting relation, but when the cot is in open position the mattress will break along said inner edges, as shown in Fig. 7. In all other respects the canvas top and the mattress sections are constructed the same as in the preferred form of the invention.

It is obvious that the invention is susceptible to modification as parts may be omitted, added and substituted without departing from the spirit of the invention as defined in the scope of the appended claims.

What we claim as new, is:

1. A top and mattress for a folding cot and comprising a top of flexible material, such as canvas, for extending between the outer ends and the sides of the frame of the cot, and a mattress stitched to the top along lines some distance back of the end and side edges of the top, so as to leave edge portions to the top which are outside the lines of stitching and which are there free from the mattress, the mattress being of an area sufficient to extend over the top, and have free edge portions which extend beyond the edges of the top, the mattress also composed of two sections corresponding with the respective supporting frame sections of the cot and separated opposite to the middle of the cot, and spaced apart lines of stitching extending transversely of and connecting the adjacent edge portions of the mattress sections and the top, so as to leave free, extended, edge portions at the adjacent edges of the mattress sections, which edge portions are of a length to substantially abut at the adjacent edges when the cot is open.

2. A combined canvas top and mattress for cots, the mattress being in two sections stitched to the top by transverse, spaced, lines of stitching at a considerable distance back of the adjoining edges of the sections, and which lines are at the middle portion of the top, and lines of stitching connecting the mattress sections with the top and extending some distance back of the side and end edges of the top, so as to leave the corresponding edge portions of the top and of the mattress sections free from each other, the mattress being of greater area than the top, whereby each of the mattress sections is provided with free edge portions all around, which when the top and mattress are flat, may abut at the adjacent edges of the sections, and which at the side and outermost edges extend a considerable distance beyond the edges of the top.

3. A combined canvas top and mattress for cots, the mattress being in two sections stitched to the top by transverse, spaced, lines of stitching at a considerable distance back of the adjoining edges of the sections, and which lines are at the middle portion of the top, and lines of stitching connecting the mattress sections with the top and extending some distance back of the side and end edges of the top, so as to leave the corresponding edge portions of the top and of the mattress sections free from each other, the mattress being of greater area than the top, whereby each of the mattress sections is provided with free edge portions all around, which when the top and mattress are flat, may abut at the adjacent edges of the sections, and which at the side and outermost edges extend a considerable distance beyond the edges of the top, the said lines of stitching for each mattress section being continuous around each section and forming an enclosed field, and tufting ties between the top and mattress section located entirely in such field.

4. A top and mattress for a folding cot, and comprising a top of flexible material for extending between the outer ends and the sides of the frame of the cot, a mattress composed of two sections of substantially the same size, separated at approximately the mid length of the mattress, and spaced apart lines of stitching extending transversely of and connecting the adjacent edge portions of the mattress sections and top, so as to leave free, extended edge portions at the adjacent edges of the mattress sections, which edge portions are of a length to substantially abut at the adjacent edges when the cot is open.

5. A top and mattress for a folding cot comprising in combination a flexible cot bottom and a mattress substantially coextensive with the bottom and composed of two sections abutting along the transverse central line of the bottom when the bottom is extended, each section being attached to the bottom by a transverse line of stitching spaced substantially from said central line and from the adjacent transverse edge of the mattress section whereby the portions of the mattress sections between the lines of stitching may together overlap the portions of the cot bottom between the two lines of stitching when the bottom is in extended position or may separate therefrom and from each other when the bottom is folded.

HYMAN GURSKY.
MORRIS VOLKES.